United States Patent [19]
White et al.

[11] Patent Number: 5,222,402
[45] Date of Patent: Jun. 29, 1993

[54] HORIZONTAL SEAT POSITION ADJUSTER

[75] Inventors: Mark D. White; Roger Freund, both of Bracebridge, Canada

[73] Assignee: Rockwell International Corporation, Pittsburgh, Pa.

[21] Appl. No.: 755,408

[22] Filed: Sep. 5, 1991

[51] Int. Cl.$^5$ .................... F16H 25/20; F16H 55/22; B60N 2/06
[52] U.S. Cl. .................. 74/89.14; 74/89.15; 74/425; 248/429; 297/330
[58] Field of Search ............. 74/89.14, 89.15, 425; 248/429, 394, 396; 297/330

[56] References Cited

U.S. PATENT DOCUMENTS

| | | | |
|---|---|---|---|
| 3,182,947 | 5/1965 | Tanaka | 248/421 |
| 3,848,477 | 11/1974 | Giandinoto et al. | 74/425 |
| 3,951,004 | 4/1976 | Heesch | 248/394 X |
| 4,509,382 | 4/1985 | Colautti et al. | 74/89.15 X |
| 4,699,017 | 10/1987 | Periou | 74/425 |
| 4,802,374 | 2/1989 | Hamelin et al. | 74/89.14 |
| 4,805,866 | 2/1989 | Aihara et al. | 297/346 X |
| 5,048,886 | 9/1991 | Ito et al. | 248/430 X |

*Primary Examiner*—Allan D. Herrmann

[57] ABSTRACT

A mechanism used to control the vertical height as well as fore-aft position of a vehicle seat while presenting a minimum height profile when adjusted to minimum vertical elevation. The seat is connected to a pair of rails, one stationary and one reciprocable. A seat is affixed to an attachment bracket which is connected to the reciprocable rail by a vertical height adjuster comprising a vertically oriented screw jack which may be positioned to selectable heights by a motor. The fore-aft relationship of the rails may also be selectively adjusted by a motor driving a horizontally oriented screw jack. Both screw jacks incorporate a screw connected to a helical gear engaged to a worm gear. The worm gear is driven by a remote motor through a flexible drive cable. Both screw jacks present a structure which offers a minimum height profile when the seat is positioned at minimum vertical height. In this manner, an aerodynamically efficient roof line may be utilized while providing maximum head room for the vehicle occupants.

3 Claims, 4 Drawing Sheets

HORIZONTAL SEAT POSITION ADJUSTER

BACKGROUND OF THE INVENTION

1. Field of the Invention

The present invention relates generally to seat adjusters of the type commonly used in motor vehicles and, more particularly, to a low profile seat adjuster providing vertical as well as fore-aft adjustment.

2. Description of Related Art

The automotive vehicle designer seeks to achieve an aerodynamic profile to satisfy fuel consumption goals as well as to provide an aesthetically appealing appearance. A low roof line is essential to achieving an aerodynamic profile. A vehicle having a low roof line must also provide adequate head room for a vehicle occupant. Therefore, a low vertical profile seat must be utilized. The vertical profile of a seat is dictated by the height of the mechanism which provides vertical as well as fore-aft positional adjustment. Conventional technology such as described in U.S. patents Tanaka U.S. Pat. No. 3,182,947 and Colautti, et al. U.S. Pat. No. 4,509,382 feature telescoping devices which include telescoping segments, which present an objectionably tall profile when adjusted to minimum vertical height position.

An additional problem encountered in seeking a seat design offering a minimum vertical profile is presented by mechanisms seeking to achieve fore-aft positioning of a vehicle seat. Such mechanisms present an overall height which is an accumulation of the individual heights of the transmission and the tracks. For example, in Aihara, et al. U.S. Pat. No. 4,805,866, the transmission is located above and coaxial with the tracks. Therefore, the minimum profile defined by a seat adjusted to minimum vertical elevation is restricted by the height of the transmission protruding above the tracks themselves. Alternatively, the transmission may be located within the track. Such an implementation, however, requires an enlarged track cross section which significantly adds to the height thereof. The minimum profile defined by a seat adjusted to minimum vertical elevation is restricted by the height of the enlarged track. Therefore, there is a need to provide vertical height adjustment as well as fore-aft seat positioning mechanisms which will provide a minimum profile to permit use of a low profile seat.

SUMMARY OF THE PRESENT INVENTION

The present invention incorporates a mechanism used to control the vertical height as well as fore-aft position of a vehicle seat while presenting a minimum height profile when adjusted to minimum vertical elevation. The seat is connected to a pair of rails, one stationary and one reciprocable. A seat is affixed to an attachment bracket which is connected to the reciprocable rail by a vertical height adjuster comprising a vertically oriented screw jack which may be positioned to selectable heights by a motor. The fore-aft relationship of the rails may also be selectively adjusted by a motor driving a horizontally oriented screw jack. Both screw jacks incorporate a screw connected to a helical gear engaged to a worm gear. The worm gear is driven by a remote motor through a flexible drive cable. Both screw jacks present a structure which offers a minimum height profile when the seat is positioned at minimum vertical height. In this manner, an aerodynamically efficient roof line may be utilized while providing maximum head room for the vehicle occupants.

The preferred embodiment of the present invention features a low vertical profile horizontal seat position adjustment mechanism to be used to provide selectable horizontal position adjustment of a vehicle seat with respect to a base which includes a pair of relatively reciprocable track members slidably interfitted with one another to form an open channel section therebetween. A first track of the pair is maintained fixed and the second track of the pair is reciprocable with respect thereto. A horizontally oriented rotatable screw is bearingly supported at opposing ends thereof to the second track and located within the open channel section defined by the interfitted track members. The screw is threadably engaged to a nut which is secured to the first track. A transmission at least partially located within the open channel formed by the interfitting track members includes a first housing defining a first bore and portion of a second bore. The first housing is structurally interfitted to a second housing so as to define a cavity therebetween. The second housing defines a bore which is axially displaced from and coaxial with the first bore. Additionally, the second housing forms a portion of a bore which is alignable with the portion of the second bore of the first housing so as to define a second bore. The first and second bore define axes which are radially displaced and orthogonally oriented with respect to one another. Additionally, the second housing includes a radially extending portion which is located about the bore axially displaced from and coaxial to the first bore thereby forming a first annular face. A helical gear is located within the cavity defined between the first and second housing. The gear includes a first diameter axially extending circumferential portion including teeth formed therein, in addition to a pair of opposed smaller diameter axially extending circumferential portions which define respective bearing surfaces. The second smaller diameter bearing surfaces of the helical gear are respectively disposed in a first bore and the bore axially displaced from and coaxial to the first bore to provide radial bearing support for the helical gear. The gear includes a radially extending surface defining a second annular face located between the respective first and second diameter portions of the helical gear which act in conjunction with the first annular face to provide an axial bearing support for the helical gear. A worm gear having first and second opposed end portions forming cylindrical coaxial bearing surfaces and an intermediate portion having a worm thread formed therein is maintained in alignment by the second bore to provide engagement with the helical gear. Fastener means are included to maintain the structural interfitting relationship between the first and second housing and secure the respective housings to the second track. Finally, means such as a flexible cable are provided to drivingly connect the helical gear of the transmission to the screw. Additionally, the nut engaged with the screw is fixed to the first track by means of a structural interfitting relationship therebetween.

These and other aspects of the present invention will become more readily apparent by reference to the following detailed description of the embodiments as shown in the drawings.

Figure 3:
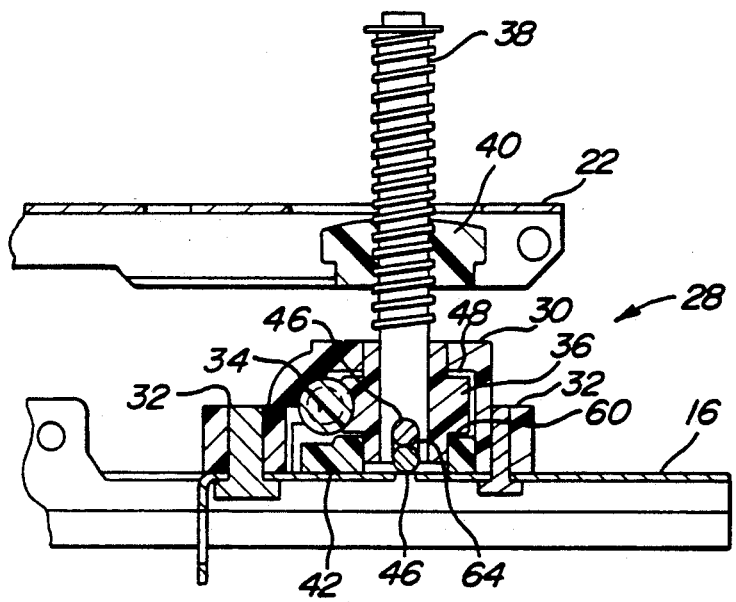
FIG. 3 is a cross-section of the vertical seat position adjuster.
Figure 4:
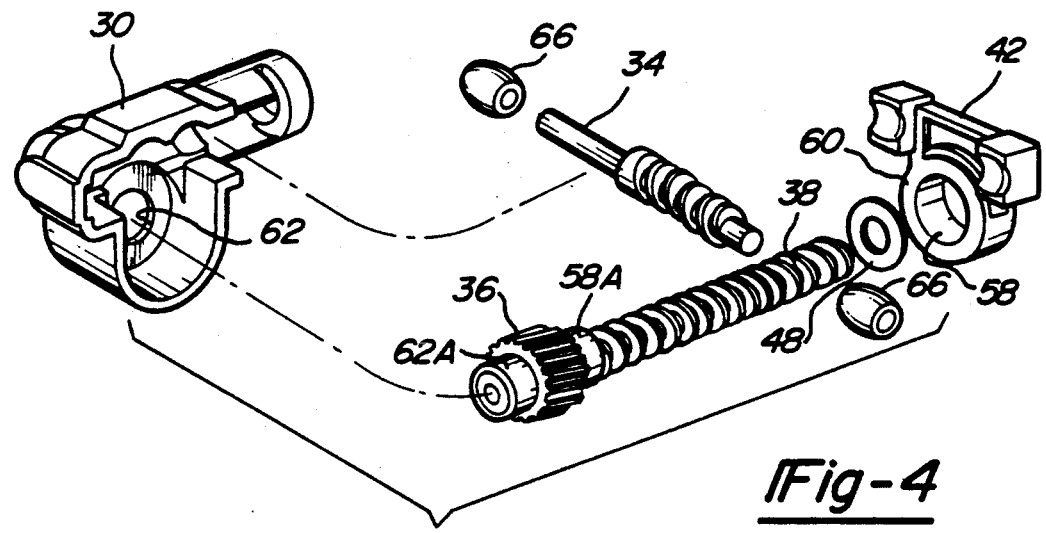
FIG. 4 is an exploded view of the vertical seat position adjuster.
Figure 5:
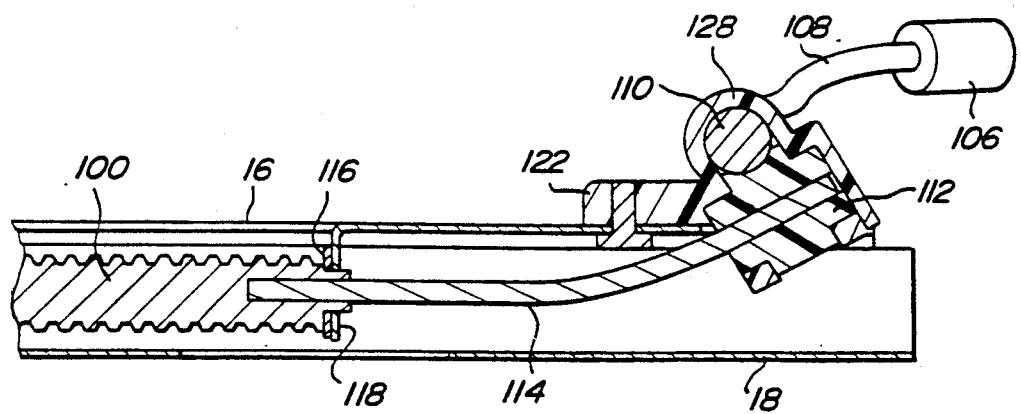
FIG. 5 is a cross-section of the horizontal seat position adjuster.
Figure 6:
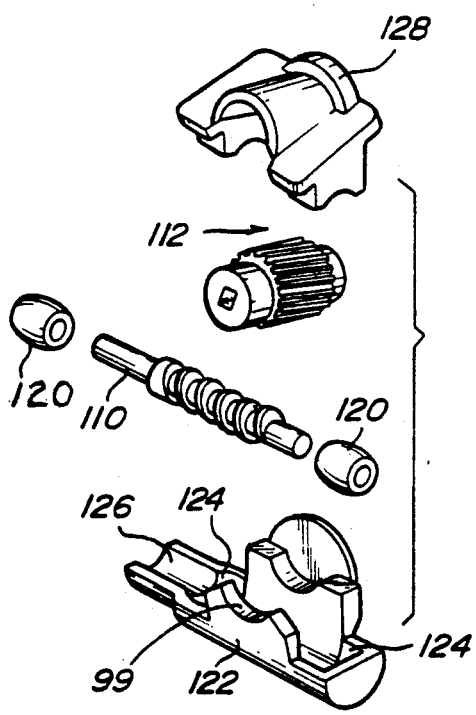
FIG. 6 is an exploded view of the horizontal seal position adjuster.
Figure 7:
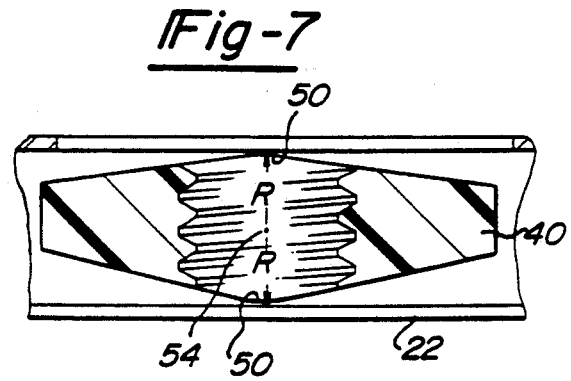
FIG. 7 is a side-view of the vertical seat position adjuster nut.
Figure 8:
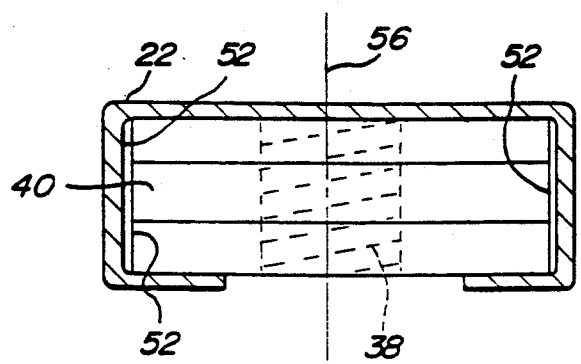
FIG. 8 is a view of the vertical seat position adjuster nut.

The preferred embodiment of the present invention, as shown in FIGS. 1 through 9 is utilized in conjunction with an adjustably mounted automotive vehicle passenger seat 10 located within the passenger compartment of a vehicle upon floor plan 12. The seat adjuster mechanism 14 includes elongated channels slidably interfitted to form an open channel section, an upper one being designated as 16, and a lower one designated as 18. Lower seat channel 18 is maintained stationary by mounting brackets 20, 20 connected to floor pan 12. Seat adjuster mechanism 14 further includes seat attachment bracket 22 and lateral interconnecting link 24. Vertical height adjusters 28, 28 are located at each of the four corners of seat 10. Vertical height adjusters 28 are utilized to control the elevation of seat 10. Vertical height adjusters 28, as shown in FIGS. 3 and 4, include a housing 30 which may be affixed to upper seat channel 16 by fasteners 32, 32. A worm gear 34 carried by spherical bearings 66, 66 is utilized to drive helical gear 36 to accomplish rotation of screw 38. As may be seen in FIG. 8, nut 40 is retained in seat attachment bracket 22 and prevented from rotation about axis 56 of screw 38 by the structural interrelationship between side portions 52, 52 and seat attachment bracket 22. Housing base plate 42 structurally fits within housing 30 to define a cavity therebetween. Bores 58 and 62 interact with respective surfaces 58A and 62A contiguous with helical gear 36 to facilitate proper radial alignment of screw 38 upon rotation thereof. Axial loading transmitted into screw 38 is imparted through helical gear 36 into annular surface 60 of housing base plate 42. Hardened steel balls 46, 46, positioned within bore 64 defined in helical gear 36, facilitate a low resistance rotational bearing for vertical height adjuster 28. Beveled washer 48 provides an axial compliance to the assembly to maintain a compliantly rigid assembly. Nut 40, as shown in FIGS. 7 and 8, is contained within seat attachment bracket 22 and maintains contact therewith at four locations; fulcrum points 50, 50 as well as sides 52, 52. The structural interrelationship of seat attachment bracket 22 and nut 40 is such that nut 40 will be retained in seat attachment bracket 22 in such a manner that it may rotate about axis 54 while maintaining continuous contact at points 50, 50 with seat attachment bracket 22. In addition, nut 40 will be restrained from rotation about axis 56 by structural interference between portions 52, 52 and seat attachment bracket 22. In this manner any rotation of screws 38 will result in a change in vertical height of seat 10.

Figure 1:
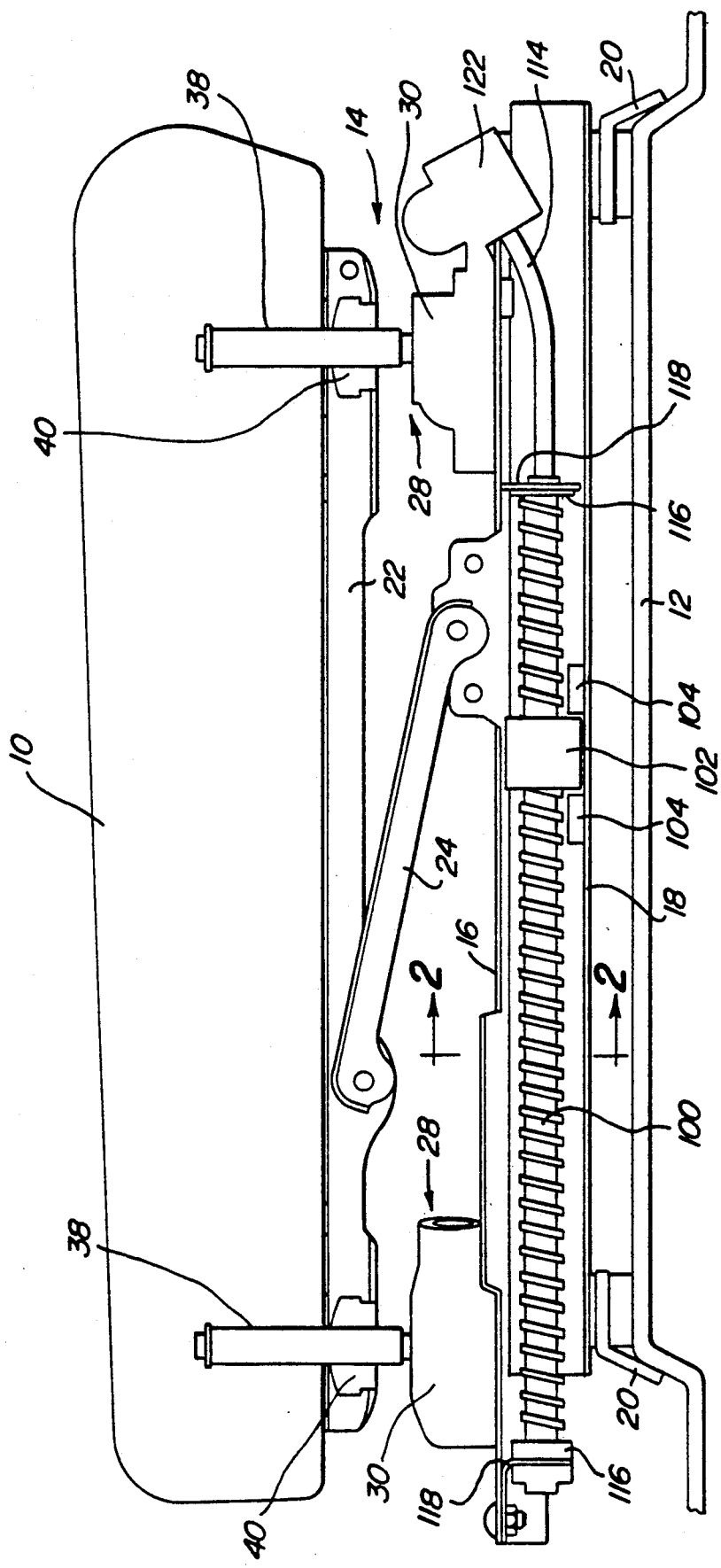
FIG. 1 is a cross-sectional view of the entire seat position adjuster.
Figure 2:
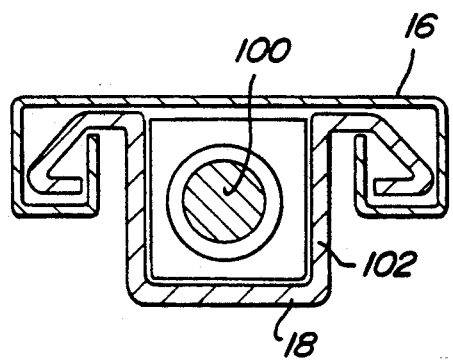
FIG. 2 is a cross-sectional view taken at line 2—2 of FIG. 1.
Figure 9:
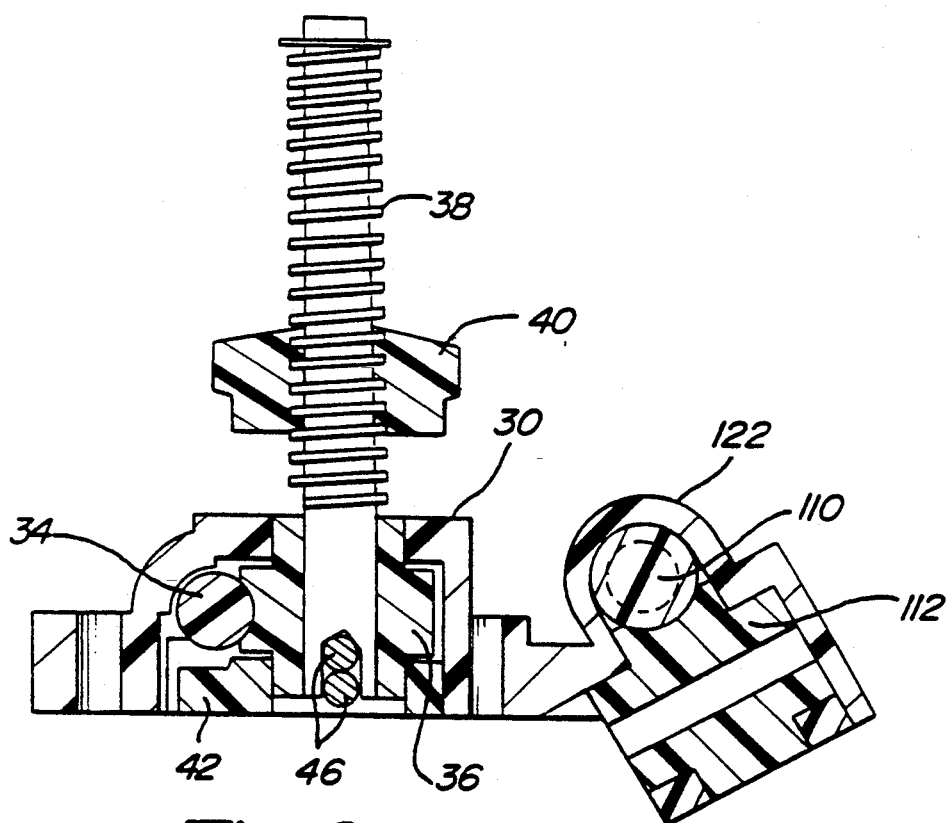
FIG. 9 is a cross-section of the modular vertical and horizontal seat position adjuster.

As shown in FIGS. 1, 5 and 6, the horizontal position of seat 10 is controlled by translating upper seat channel 16 with respect to lower seat channel 18 by rotating screw 100 while maintaining drive nut 102 stationary. Retention tabs 104, 104 define a fore-aft stationary position for nut 102 whereas the structural interrelationship between lower seat channel 18 and nut 102 prevent rotation of nut 102 about the axis of screw 100. As shown in FIG. 5, motor 106 drives a first flexible cable 108 which causes worm gear 110 engaged with helical gear 112 to rotate. Helical gear 112 as shown includes a first diameter axially extending circumferential portion having gear teeth formed thereon as well as opposed trunnion like smaller diameter axially extending circumferential portions defining bearing surfaces. Worm gear 110 engaged with helical gear 112 causes a transmission of rotary motion both in angle of axis as well as respective relative rates of rotation known to one skilled in the art as a transmission. Worm gear 110 is carried by two spherical bearings 120 in housing 122. Worm gear 110 has end portions forming cylindrical coaxial bearing surfaces and an intermediate portion having a worm thread formed thereon. Housing 122 defines recesses 124, 124 and half-bores 99, 126 wherein half-bore 99 is disposed orthogonal to half bore 126 which cooperate with respective recesses defined in housing closure cap 128 to facilitate bearing support and engagement between helical gear 112 and worm gear 110. Housing 122 and 128 interfit to form orthogonally disposed bores and provide a cavity suitable for receipt of helical gear 112 and worm gear 110. Housing 122 and 128 may be secured together by known techniques such as heat welding or gluing. The assembly thereof may be secured to track 16 by fasteners. Flexible cable 114 transmits rotary motion to drivingly connect helical gear 112 to screw 100 causing same to rotate about stationary nut 102 producing a translation of screw 100. Upper seat channel 16 is connected to screw 100 at opposing ends through bearings 116, 116 which engage brackets 118, 118 connected thereto. In this manner, remotely located motor 106 may produce fore-aft translation of seat 10 to provide selectively adjustable position thereof. Jack housing 30 and housing 122 may be structurally interconnected, as shown in FIG. 9, to provide a modular assembly that presents a consolidation of mounting tabs and associated fasteners requiring minimal package space and substantial weight savings.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A low vertical profile horizontal seat position adjustment mechanism to be used to provide selectable horizontal position adjustment of a vehicle seat with respect to a base comprising:

a pair of relatively reciprocable track members slidably interfitted with one another to form an open channel section therebetween;

a first track of said pair maintained fixed and a second track of said pair reciprocable with respect thereto;

a horizontally oriented rotatable screw bearingly supported at opposing ends by said second track and disposed within said open channel section;

said screw threadably engaging a nut affixed to said first track;

a transmission partially disposed within said open channel section;

said transmission comprising a first housing 122 defining a first half bore and a second half bore disposed orthogonal to said first half bore;

a second housing 128 having a structural interfitting relationship with said first housing;

said second housing defining a first half and a second half bore which interact with respective first and second half bores of said first housing to form first and second bores;

said first and second bores defining axes which are radially displaced and orthogonally oriented with respect to one another;

a helical gear disposed within said cavity defined between said first and second housing;

said helical gear including a first diameter axially extending circumferential portion including teeth formed therein;

said helical gear including opposed second smaller diameter axially extending circumferential portions defining respective bearing surfaces;

said second smaller diameter bearing surfaces of said helical gear being respectively disposed in said first bore and said bore axially displaced from and coaxial to said first bore to provide radial bearing support for said helical gear;

said helical gear including a radially extending surface defining a second annular face disposed between respective first and second diameter portions of said helical gear acting in conjunction with said first annular face to provide an axial bearing support for said helical gear;

a worm gear having first and second opposed end portions forming cylindrical coaxial bearing surfaces and an intermediate portion having a worm thread formed therein;

said first and second portions bearingly carried in said second bore to provide alignment to said worm thread with said teeth of said helical gear;

means to maintain said structurally interfitting relationship between said first and second housing and secure said first housing to said second track; and means to drivingly connect said helical gear of said transmission to said screw.

2. The invention of claim 1 wherein said not is affixed to said first track by means of a structural interfitting relation between said nut and said first track.

3. The invention of claim 1 wherein said means to drivingly interconnect said helical gear and said screw is a flexible cable.

* * * * *